(12) United States Patent
Dille

(10) Patent No.: US 7,111,519 B2
(45) Date of Patent: Sep. 26, 2006

(54) TUBE ASSEMBLY AND METHOD

(75) Inventor: Joseph C. Dille, Telford, PA (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/707,078

(22) Filed: Nov. 19, 2003

(65) Prior Publication Data
US 2005/0103122 A1    May 19, 2005

(51) Int. Cl.
G01F 1/84    (2006.01)
(52) U.S. Cl. .................................................. 73/861.355
(58) Field of Classification Search ........... 73/861.354, 73/861.355, 861.356, 861.357
See application file for complete search history.

(56) References Cited

U.S. PATENT DOCUMENTS

| | | | |
|---|---|---|---|
| 2,331,932 A | 10/1943 | Rowand | |
| 4,768,385 A | 9/1988 | Cage | |
| 4,895,031 A * | 1/1990 | Cage | 73/861.355 |
| 5,253,520 A | 10/1993 | Drexel et al. | |
| 5,344,717 A * | 9/1994 | Dutton et al. | 428/598 |
| 5,405,176 A | 4/1995 | Babel et al. | |
| 6,519,828 B1 * | 2/2003 | Cook et al. | 29/447 |
| 6,634,241 B1 | 10/2003 | Van Cleve | |

OTHER PUBLICATIONS

PCT International Search Report for International Application No. PCT/US2004/038836 dated Jun. 2, 2005.
PCT Written Opinion of the International Searching Authority for International Application No. PCT/US2004/038836 dated Jun. 2, 2005.

* cited by examiner

Primary Examiner—Harshad Patel
(74) Attorney, Agent, or Firm—Locke Liddell & Sapp LLP

(57) ABSTRACT

A flow sensor tube assembly includes a base member having first and second generally opposing sides. An opening extends through the base member, and an end of a flow sensor tube is received in the opening. A filler material is situated in the opening surrounding the flow sensor tube adjacent the first side of the base member to attach the tube to the base member. The flow sensor tube is welded to the base member adjacent the second side of the base member.

13 Claims, 3 Drawing Sheets

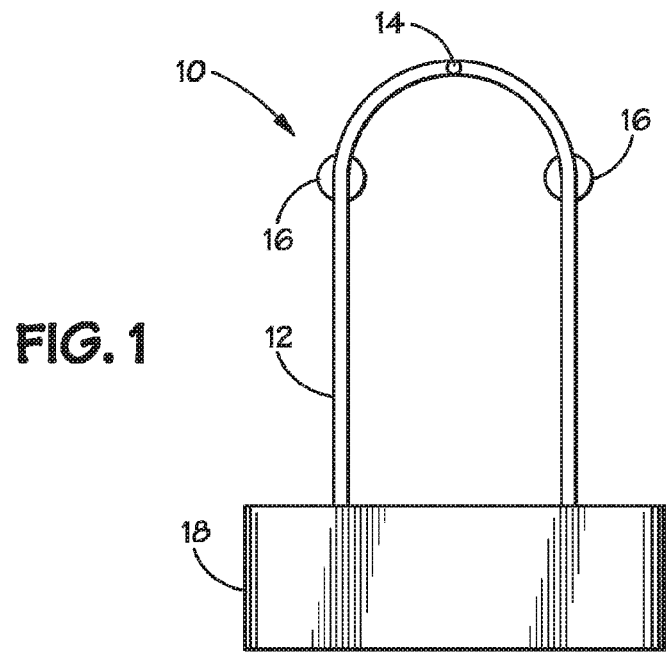
FIG. 1
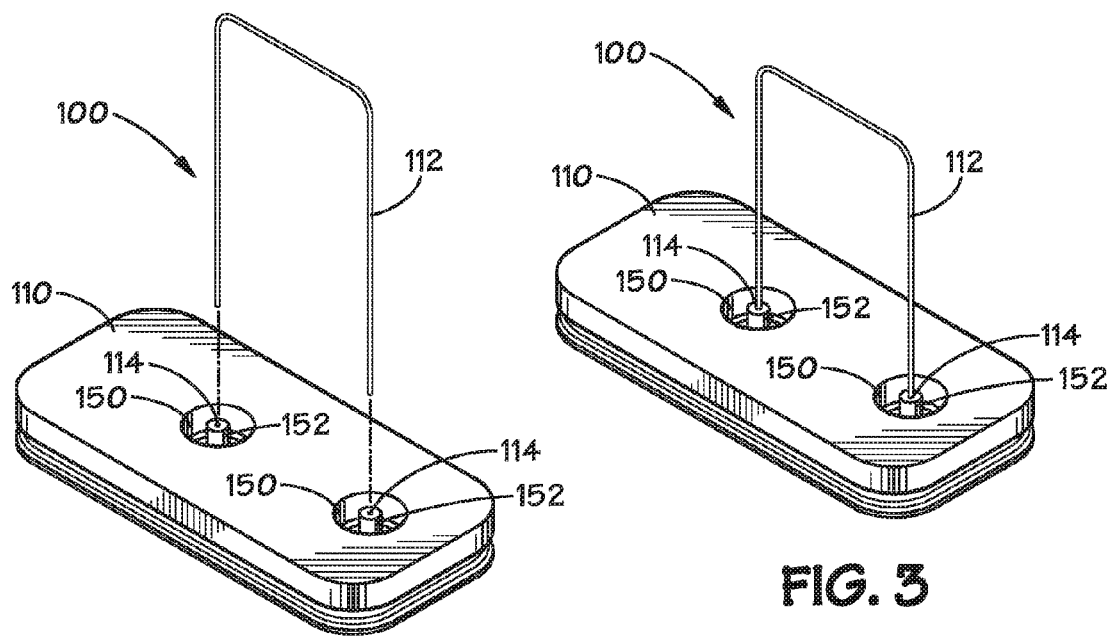
FIG. 2
FIG. 3

TUBE ASSEMBLY AND METHOD

BACKGROUND

1. Field of the Disclosure

The invention relates generally to tube connections, and more particularly, to connecting a flow measurement tube to a base member.

2. Discussion of Related Art

The measurement and control of fluid flow is extremely important in the process industries. Many manufacturing processes require extreme accuracy and repeatability in fluid delivery, and thus demand that the mass flow rate of process fluids be precisely measured and controlled. Various technologies are known for measuring mass flow. For example, mass flow measurement based on the Coriolis force effect provides a direct measurement of mass flow. In the case of the typical Coriolis force flow sensor, a flow sensing tube, through which fluid flow is to be established, is vibrated. Often the tube is in the shape of one or more loops. The loop shape is such that the mass flow vector is directed in opposite directions at different parts of the loop. The tube loops may, for example, be "U" shaped, rectangular, triangular or "delta" shaped or coiled. In the special case of a straight tube, there are two simultaneous angular velocity vectors that are coincident to the anchor points of the tube while the mass flow vector is in a single direction.

The angular velocity vector changes directions since, in a vibrating system, the direction of rotation changes. The result is that, at any given time, the Coriolis force is acting in opposite directions where the mass flow vectors or the angular velocity vectors are directed in opposite directions. Since the angular velocity vector is constantly changing due to the vibrating system, the Coriolis force is also constantly changing. The result is a dynamic twisting motion being imposed on top of the oscillating motion of the tube. The magnitude of twist is proportional to the mass flow for a given angular velocity.

A thermal mass flow instrument measures flow by routing a small portion of the fluid stream through a flow sensing tube. Heat is applied at the midpoint of the sensing tube, with temperature sensors located on either side of the heater. Each temperature sensor measures the temperature of the fluid at its respective location. The first temperature sensor measures the temperature upstream of the heater. The second temperature sensor measures the temperature downstream of the heater and reflects a temperature corresponding to the fluid as heated by the heater. The temperature difference of the fluid on either side of the heater is proportional to the mass flow rate.

The flow sensing tube in such flow measurement devices is typically connected to a base member, typically at or near the inlet and outlet ends of the tube. To provide reliable operation, the tube connections must be solid and leak-free. Typically, the flow tube is brazed to the base member. Brazing produces a solid and leak free connection but may have inferior corrosion resistance when compared to the tube material. Welding is a preferred joining technique. However, known manufacturing processes and tolerances often make it difficult to achieve satisfactory welded tube connection joints, especially in low-flow applications, which require very small flow sensing tubes.

The present invention addresses shortcomings associated with the prior art.

SUMMARY

In one aspect of the present disclosure, a flow sensor tube assembly includes a base member having first and second generally opposing sides. An opening extends through the base member, and an end of a flow sensor tube is received in the opening. A filler material is situated in the opening surrounding the flow sensor tube adjacent the first side of the base member to attach the tube to the base member. A groove may be defined in the first side of the base member surrounding the opening forming a raised boss adjacent the opening to facilitate a brazing operation. The flow sensor tube is welded to the base member adjacent the second side of the base member. To achieve an improved weld in exemplary embodiments, a nipple is defined by the second side of the base member to better match the thickness of the parts being welded. Further, the nipple may be formed around the flow sensor tube so as to eliminate a gap between the opening and the flow sensor tube.

A second opening may be provided to receive the opposite end of the flow sensor tube. This end of the tube may be connected to the base member in the same manner as the first end, with a filler material being situated in the second opening surrounding the flow sensor tube adjacent the first side of the base member, and the second end of the flow sensor tube being welded to the base member adjacent the second side of the base member.

A method of attaching a tube to a base member includes inserting an end of the tube into an opening extending through the base member is also disclosed. Filler material is situated in the opening around the tube adjacent a first side of the base member to connect the tube to the base member. Additionally, the tube is welded to the base member adjacent a second side of the base member. The second side of the base member may be formed to the tube to eliminate a gap between the opening and the tube. In certain implementations, a conical nipple defined by the base member is formed using a clearance adjuster, or swage, to eliminate clearance between the opening and the tube.

BRIEF DESCRIPTION OF DRAWINGS

Other objects and advantages of the invention will become apparent upon reading the following detailed description and upon reference to the drawings in which:

FIG. 1 is a block diagram illustrating portions of a mass flow measurement device.

FIG. 2 is an exploded perspective view of a tube assembly in accordance with aspects of the present invention.

FIG. 3 is an assembled perspective view of the tube assembly shown in FIG. 2.

Figure 4:
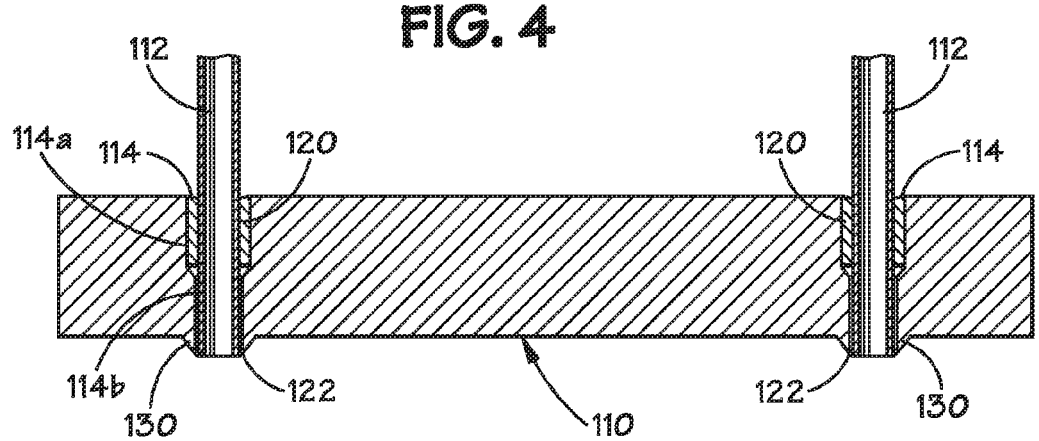
FIG. 4 is a sectional view showing portions of the tube assembly shown in FIGS. 2 and 3.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates portions of a Coriolis based mass flow sensor. For sake of simplicity, portions of the disclosure are presented as implemented in a Coriolis mass flow measurement device, however, the present disclosure is applicable to other devices requiring a secure, fluid-tight tube connection. For example, it would be a routine undertaking for one skilled in the art, having the benefit of this disclosure, to apply the concepts disclosed to other flow measurement devices, such as a thermal mass flow measurement device.

The Coriolis mass flow sensor 10 shown in FIG. 1 includes a flow sensor tube 12, with a drive device 14 situated relative thereto so as to vibrate the tube 12. Pick-off devices 16 are positioned relative to the tube 10 so as to measure the twist in the tube 10 due to Coriolis force. The ends of the flow sensor tube 10 are attached to a base member that is situated in a base housing 18 that would contain the device inlet and outlet connections. The exemplary flow sensor tube 10 shown in FIG. 1 is generally "U" shaped, though other shapes, such as delta shaped, rectangular, coiled, or straight tubes may also be used.

FIG. 2 is an exploded perspective view of an exemplary flow sensor tube assembly 100 in accordance with aspects of the present invention. The sensor tube assembly 100 includes a base member 110 and a flow sensor tube 112. The base member 110 has openings 114 extending therethrough that receive ends of the flow sensor tube 112. Generally, one end of the flow sensor tube 112 is the inlet and the opposite end is the outlet, such that fluid flow can be established in the flow sensor tube 112 to measure the flow rate. FIG. 3 shows the flow sensor tube assembly 100 with the ends of the flow sensor tube 112 received in the openings 114.

FIG. 4 is a sectional view showing the ends of the flow tube 112 received in the openings 114 in the base member 110. A filler material 120 is situated in the opening 114 surrounding the flow sensor tube 112 adjacent a first side (top side as shown in FIG. 4) of the base member 110 to attach the tube 112 to the base member adjacent the first, or top, side of the base member 110. In exemplary embodiments, a low temperature alloy material is used to achieve a brazed connection adjacent the top side of the base member 110. Silver braze alloys are suitable filler material for the braze joint. In other embodiments, solder or an adhesive such as epoxy are used for the filler material to attach the flow sensor tube 112 adjacent the first side of the base member 110.

The flow sensor tube 112 is also connected to the base member 110 by a second joint 122 at the second side (bottom side as shown in FIG. 4), where it is welded to the base member 110. The dual joint attachment of the flow sensor tube 112 to the base member 110 provides a secure, leak-free attachment. The weld attachment 122 provides a fluid seal, and the brazed joint 120 provides structural attachment.

In exemplary embodiments, the opening 114 has two segments 114a and 114b defining first and second diameters, respectively. The diameter of the first segment 114a is greater than the second diameter 114b, such that a radial gap is formed around the tube 112 to provide space for the filler material 120. In certain embodiments using a braze filler material, induction heating is used to achieve the brazed joint, since this provides adequate local heat and does not disrupt the tube 112. To facilitate the brazing process, the top side of the base member 110 defines a circular groove 150 to create a raised boss 152 that allows placement of an induction heating tool to achieve the brazed joint.

Figure 5:
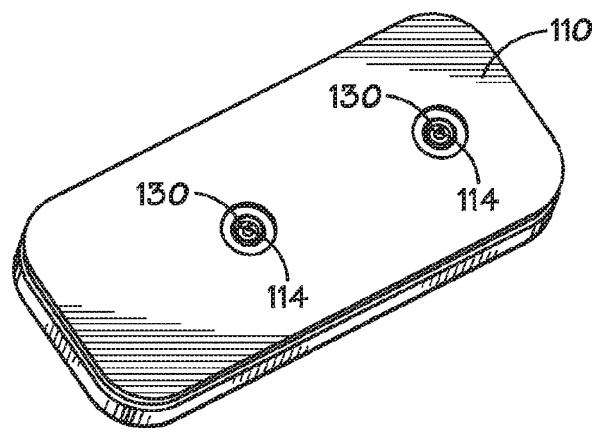
FIG. 5 is a bottom view of the base member of the tube assembly shown in FIGS. 2 and 3.

When welding, it is desirable to match the thickness of the two parts being welded. The base member 110 is typically considerably thicker than the tube 112, especially in low flow applications using a very small tube. To more closely match the thickness of the plate to the thickness of the base member 110 to the wall of the tube 112, a nipple 130 is formed into the bottom of the base member 110. FIG. 5 is a bottom perspective view of the base member 110 showing the nipples 130 defined by the base member 110.

In an exemplary flow tube assembly, the base member 110 is about 0.330 inch thick, and the flow sensor tube 112 has a wall thickness of about 0.001 inch. In this exemplary embodiment, the end of the nipple 130 tapers to about 0.001 inches (same as the tube wall thickness), which is where the weld is performed.

In addition to matching the thickness of the parts being welded, it is preferable to reduce the gap between them to about 10% of the thickness of the parts. Manufacturing tolerances between the second segment 114b and diameter of the tube 112 may make it difficult to achieve the intimate contact required between the flow sensor tube 112 and the base member 110 to achieve a consistent weld and a fluid-tight joint. In the case of the exemplary embodiment cited above wherein the tube 112 has a wall thickness of 0.001 inch, the acceptable gap would be 0.0001 inch. However, a typical tolerance for the outside diameter of the flow sensor tube 112 would be ±0.0002 inch, which could result in an unacceptable 0.0004 inch gap.

Figure 6:
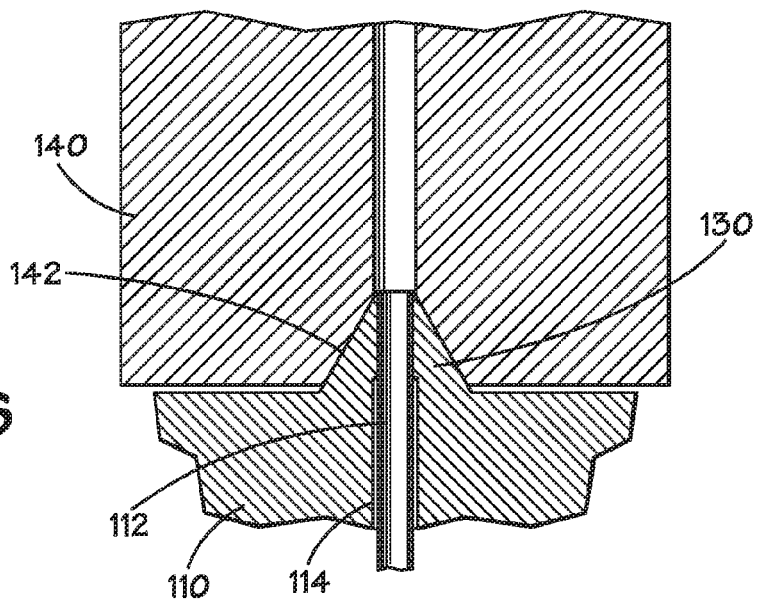
FIG. 6 is a sectional view conceptually illustrating a clearance adjuster and portions of the tube assembly disclosed herein.

To achieve the intimate contact despite manufacturing tolerances, after insertion of the tube 112 into the opening 114 the base member 110 may be formed to eliminate the gap between the tube 112 and second segment 114a of the opening 114. As shown in FIG. 4, a portion of the second segment 114b of the opening 114 is situated in the nipple 130. In exemplary embodiments, a clearance adjuster, or swage 140, is pressed onto the nipple 130 with a controlled force to close any gap between the opening 114 and the flow sensor tube 112. FIG. 6 conceptually illustrates a swaging process to form the base member 110 around the tube 112 in an exemplary tube assembly. FIG. 6 shows the base member 110 inverted, so that the nipple 130 formed by the bottom side of the base member 110 is pointing upwards as viewed in the drawing. In the illustrated embodiment, the nipple 130 is generally conical, defining a taper of about 62°. The clearance adjuster 140 has a taper 142 of about 60° that interferes with the nipple 140 when a force is applied to the clearance adjuster 140 to swage the opening 114 around the tube 112, eliminating any clearance therebetween.

Figure 7:
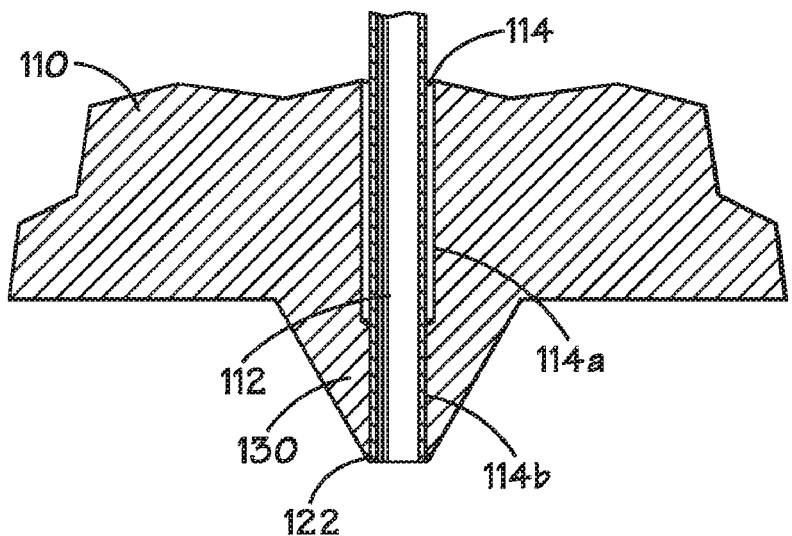
FIGS. 7 and 8 are sectional views of tube assemblies illustrating exemplary tube positions relative to a base member.
Figure 8:
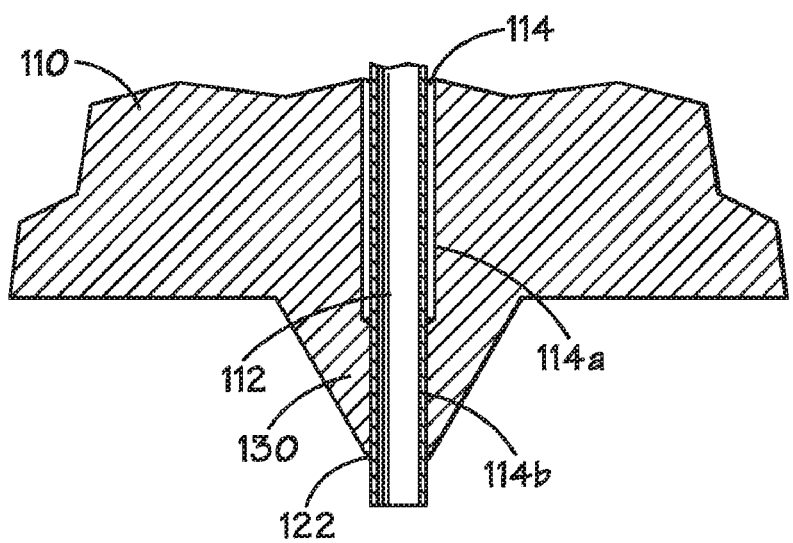

FIGS. 7 and 8 illustrate some different tube positions/weld geometries. In FIG. 7, the tube 112 is situated such that the end of the tube 112 is generally flush with the nipple 130. In this situation, the weld would be done normal to the base member 110. In FIG. 8, the tube 114 protrudes from the base member 110. In this situation, the weld would be done at an angle.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A flow sensor tube assembly, comprising:
   a base member having first and second generally opposing sides;
   a nipple defined by the second side of the base member and extending from the second side of the base member;
   an opening extending through the base member and the nipple, the opening having first and second segments defining first and second diameters, respectively, the first diameter being greater than the second diameter, at least a portion of the second segment being situated within the nipple;
   a flow sensor tube having an end received in the opening;
   a filler material situated in the first segment of the opening surrounding the flow sensor tube adjacent the first side of the base member; and
   the flow sensor tube being welded to the nipple extending from the second side of the base member.

2. The flow sensor tube assembly of claim 1, wherein the filler material is situated in the first segment of the opening surrounding the flow sensor tube.

3. The flow sensor tube assembly of claim 1, wherein the entire second segment of the opening is situated in the nipple.

4. The flow sensor tube assembly of claim 1, wherein the nipple is formed around the flow sensor tube so as to eliminate a gap between the opening and the flow sensor tube.

5. The flow sensor tube assembly of claim 1, wherein a portion of the flow sensor tube extends from second side of the base member.

6. The flow sensor tube assembly of claim 1, further comprising:
   a second opening extending through the base member;
   a second end of the flow sensor tube being received in the second opening;
   a filler material situated in the second opening surrounding the flow sensor tube adjacent the first side of the base member; and
   the second end of the flow sensor tube being welded to the base member adjacent the second side of the base member.

7. The flow sensor tube assembly of claim 1, wherein the first and second sides define corresponding generally planar first and second parallel surfaces, and further comprising a groove defined in the first surface of the base member surrounding the opening creating a raised boss adjacent the opening.

8. The flow sensor tube assembly of claim 1, wherein the filler material comprises a braze material.

9. The flow sensor tube assembly of claim 1, wherein the filler material comprises solder.

10. The flow sensor tube assembly of claim 1, wherein the filler material comprises an epoxy.

11. A flow sensor tube assembly, comprising:
    a base member having first and second generally opposing sides;
    a nipple defined by the second side of the base member and extending from the second side of the base member;
    an opening extending through the base member, the opening having first and second segments defining first and second diameters, respectively, the first diameter being greater than the second diameter, at least a portion of the second segment being situated within the nipple;
    a flow sensor tube having an end received in the opening;
    first means for attaching the flow sensor tube to the base member adjacent the first side of the base member; and
    second means for attaching the flow sensor tube to the base member adjacent the second side of the base member.

12. A flow sensor tube assembly, comprising:
    a base member having first and second generally opposing sides, the first and second sides defining corresponding generally planar first and second parallel surfaces;
    an opening extending through the base member, the opening having first and second segments defining first and second diameters, respectively, the first diameter being greater than the second diameter;
    a groove defined in the first surface of the base member surrounding the opening creating a raised boss adjacent the opening;
    a flow sensor tube having an end received in the opening;
    a filler material situated in the first segment of the opening surrounding the flow sensor tube adjacent the first side of the base member; and
    the flow sensor tube being welded to the base member adjacent the second side of the base member.

13. The flow sensor tube assembly of claim 12, further comprising:
    a nipple defined by the second side of the base member and extending from the second side of the base member;
    the opening extending through the base member and the nipple;
    at least a portion of the second segment being situated within the nipple; and
    the flow sensor tube being welded to the nipple extending from the second side of the base member.

* * * * *